United States Patent [19]

Dudzik et al.

[11] Patent Number: 5,730,454
[45] Date of Patent: Mar. 24, 1998

[54] ANTI-JACKKNIFING DEVICE

[76] Inventors: Joe H. Dudzik, H.C.63 Box 251, Clinton, Ark. 72031; Charles E. Slycord, P.O. Box 5228, Ventura, Calif. 93005

[21] Appl. No.: 510,431

[22] Filed: Aug. 2, 1995

[51] Int. Cl.⁶ ................................................. B62D 53/08
[52] U.S. Cl. .................................... 280/432; 280/433
[58] Field of Search ........................ 280/432, 423.1, 280/433, 446.1, 455.1; 92/221

[56] References Cited

U.S. PATENT DOCUMENTS

| | | | |
|---|---|---|---|
| 2,084,834 | 6/1937 | Britt | 92/221 |
| 2,462,211 | 2/1949 | Moore | 280/432 |
| 2,959,429 | 11/1960 | Lavelle | 280/432 |
| 3,103,201 | 9/1963 | Owen | 280/432 X |
| 3,733,090 | 5/1973 | Keller | 280/432 |
| 3,883,160 | 5/1975 | Meyers et al. | 280/432 |
| 4,119,330 | 10/1978 | Capps | 280/432 |
| 4,120,514 | 10/1978 | Sanders | 280/432 |
| 4,204,700 | 5/1980 | Haines, Sr. | 280/432 |
| 4,241,934 | 12/1980 | Buehner | 280/432 |
| 4,438,943 | 3/1984 | Hebert | 280/432 |
| 4,556,232 | 12/1985 | Sever | 280/432 |
| 4,573,699 | 3/1986 | Smith | 280/432 |
| 4,790,556 | 12/1988 | Hawkins et al. | 280/432 |
| 5,098,115 | 3/1992 | Haire et al. | 280/476.1 |
| 5,558,351 | 9/1996 | Hunter | 280/432 |

*Primary Examiner*—Victor E. Johnson
*Attorney, Agent, or Firm*—Charles D. Gunter, Jr.; Grady K. Bergen

[57] ABSTRACT

An anti-jackknifing device for a tractor and trailer combination is provided having a pressure cylinder with an axial bore which mounts to the lower surface of a fifth wheel plate of the tractor. A piston locates within the axial bore and has a stop pin which project into a stop bore formed in the fifth wheel plate and into a slot formed in a trailer plate of the trailer. An end plug couples to the pressure cylinder for sealing the axial bore and is removable to allow the interior of the axial bore to be accessed. Also provided on the piston is a socket which allows a piston removal tool to be inserted therein so that the piston can be removed from the axial bore when the end plug is removed. The structure of the anti-jackknifing device prevents stresses on the fasteners or bolts used in securing the pressure cylinder to the fifth wheel plate as a result of lateral forces being exerted on the stop pin.

26 Claims, 3 Drawing Sheets

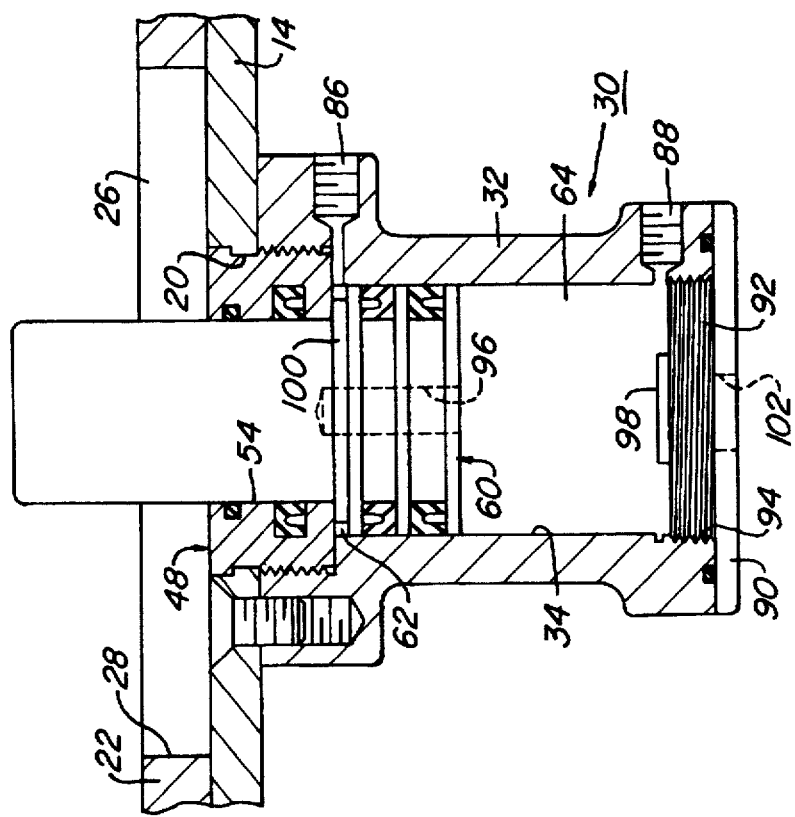
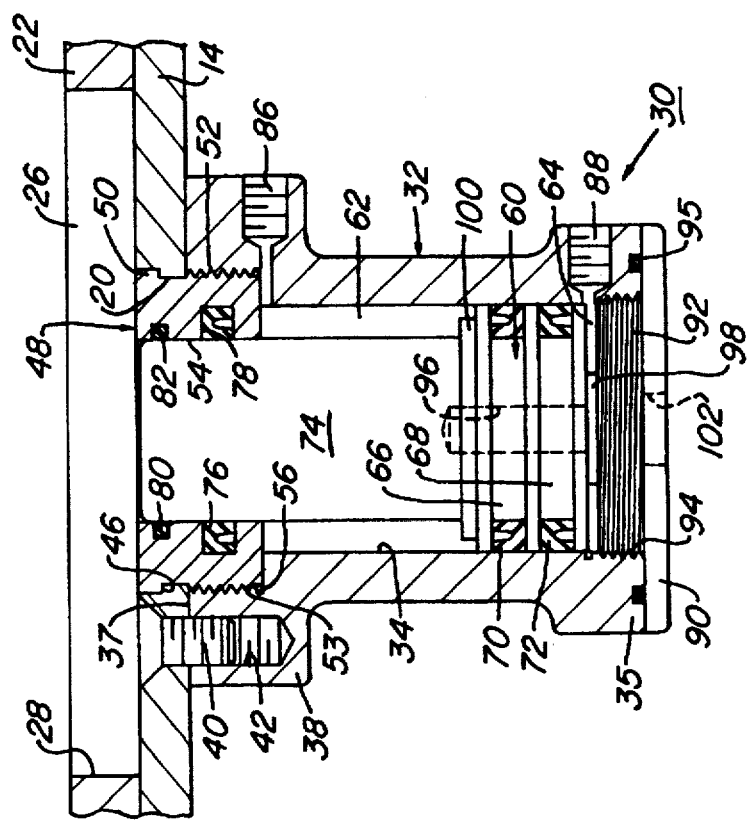
Fig. 3
Fig. 2

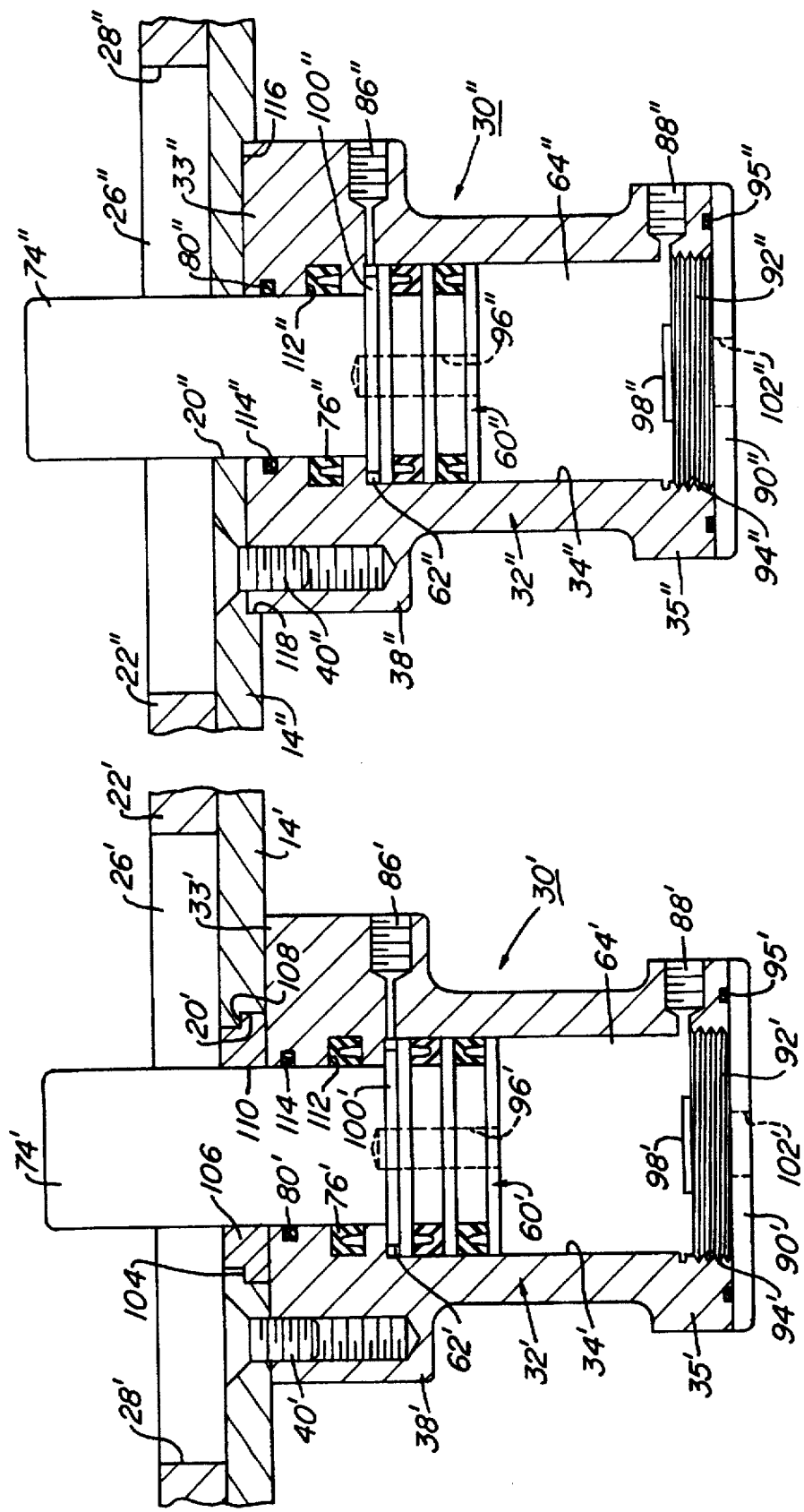

ANTI-JACKKNIFING DEVICE

BACKGROUND OF THE INVENTION

1. Field of the Invention

This invention relates generally to fifth wheel safety devices and specifically to an anti-jackknifing device for use in a tractor and trailer combination.

2. Description of the Prior Art

There are various devices available for preventing jackknifing of tractor-trailers. Jackknifing is the angular articulation of a trailer relative to its associated tractor caused by the momentum of a moving trailer being thrown off center so that the trailer is caused to skid or slide about the pivotal connection which joins the trailer to its tractor. This often happens, especially during slick road conditions, when the tractor-trailers are traveling at high speeds and are required to stop suddenly.

Anti-jackknifing devices usually consist of some type of retractable stop which is mounted to a fifth wheel coupler of the tractor and which selectively engages the trailer to limit its articulation about the pivotal connection to which it is joined. While there are various designs for anti-jackknifing devices, improvements are needed.

It is therefore an object of the present invention to provide an anti-jackknifing system which cooperates with a fifth wheel arrangement to limit the angular movement of a towed trailer from the line of travel of its associated tractor.

Another object of the invention is to provide such a device which is simple in design and economical to manufacture.

Another object of the invention is to provide such a system which reliably engages a fifth wheel coupling to safely limit the turning movement of the trailer, when actuated, to prevent jackknifing.

Another object of the invention is to provide an improved device for use in an anti-jackknifing system which provides improved access to the internal components of the device for ease of maintenance and repair.

These and other objects, features and advantages will be apparent from the written description which follows.

SUMMARY OF THE INVENTION

An anti-jackknifing device is used on a tractor and trailer combination which are coupled together. A fifth wheel plate mounts to the tractor and has a stop bore formed therein. A trailer plate mounts to the trailer and has an elongated slot with opposite ends. The trailer plate bears against the fifth wheel plate and couples thereto by a pivotal connection so that the trailer is pivotable relative to the tractor about the pivotal connection. The slot aligns with the stop bore when the trailer plate is coupled to the fifth wheel plate and the tractor and trailer are within a selected degree of angular displacement relative to each other.

A pressure cylinder having an upper end and a lower end has an axial bore which extends between the upper and lower ends. The upper end of the cylinder mounts to a lower surface of the fifth wheel plate so that the axial bore is aligned with the stop bore of the fifth wheel plate. The cylinder has a pair of fluid ports for allowing the egress and ingress of pressurized fluid within the axial bore. A piston located within the axial bore of the cylinder divides the axial bore into opposite upper and lower chambers. Each fluid port opens into one of the opposite chambers.

The piston has a stop pin joined thereto and is reciprocally moveable between an extended position and a retracted position in response to pressurized fluid being introduced into the chambers from the fluid ports. The stop pin projects from the upper chamber of the axial bore through the stop bore of the fifth wheel plate and into the slot of the trailer plate when the piston is moved to the extended position. The stop pin engages one of the ends of the slot to limit pivotal movement of the trailer relative to the tractor about the pivotal connection beyond the selected degree of angular displacement. The stop pin locates below the slot of the trailer plate when the piston is moved to the retracted position to allow the trailer to pivot about the pivotal connection beyond the selected degree of angular displacement. A seal member surrounds the stop pin for sealing the upper chamber of axial bore while allowing the stop pin to be moved between the extended and retracted positions. An end plug couples to the pressure cylinder for sealing the lower chamber of the axial bore and which is removable to allow the interior of the axial bore to be accessed. The piston is also provided with a tool engagement means, such as a threaded socket, adapted for engaging a piston removal tool so that the piston can be removed from the axial bore when the end plug is removed.

In one embodiment, a threaded lock nut serves as a cylinder locking member having a lower portion and upper portion with a central bore extending therethrough. The upper portion of the locking member is received within the stop bore of the fifth wheel plate. The locking member is secured within the stop bore with the lower portion of the locking member extending downward from the stop bore of the fifth wheel plate into the axial bore of the pressure cylinder. An upper end of the pressure cylinder fits flush against a lower surface of the fifth wheel plate. The central bore of the locking member closely receives the stop pin as the stop pin is moved to the extended position.

In another embodiment, a bushing member is received and retained within the stop bore of the fifth wheel plate and closely receives the stop pin when the stop pin is moved to the extended position. Lateral forces that are exerted against the stop pin by the ends of the slot of the trailer plate are thus transferred from the stop pin through the bushing member and to the fifth wheel plate.

In yet another embodiment, the lower surface of the fifth wheel plate is machined to provide a recess defined by a peripheral edge. The recess is configured to closely receive the upper end of the pressure cylinder so that lateral forces which are exerted against the stop pin by the ends of the slot of the trailer plate are at least partly transferred through the pressure cylinder to the peripheral edge of the recess.

BRIEF DESCRIPTION OF THE DRAWINGS

FIG. 2 is a cross-sectional side view of an anti-jackknifing device shown in a retracted position and constructed in accordance with the invention;

FIG. 3 is the anti-jackknifing device of FIG. 2, shown with the device in an extended position;

FIG. 4 is a cross-sectional side view of another embodiment of the anti-jackknifing device utilizing a bushing within a stop bore of the fifth wheel plate and constructed in accordance with the invention; and FIG. 5 is a cross-sectional side view of still another embodiment of the anti-jackknifing device wherein a recess is shown formed in the fifth wheel plate with an upper end of the pressure cylinder being received within the recess of the fifth wheel plate and constructed in accordance with the invention.

DETAILED DESCRIPTION OF THE PREFERRED EMBODIMENT

Figure 1:
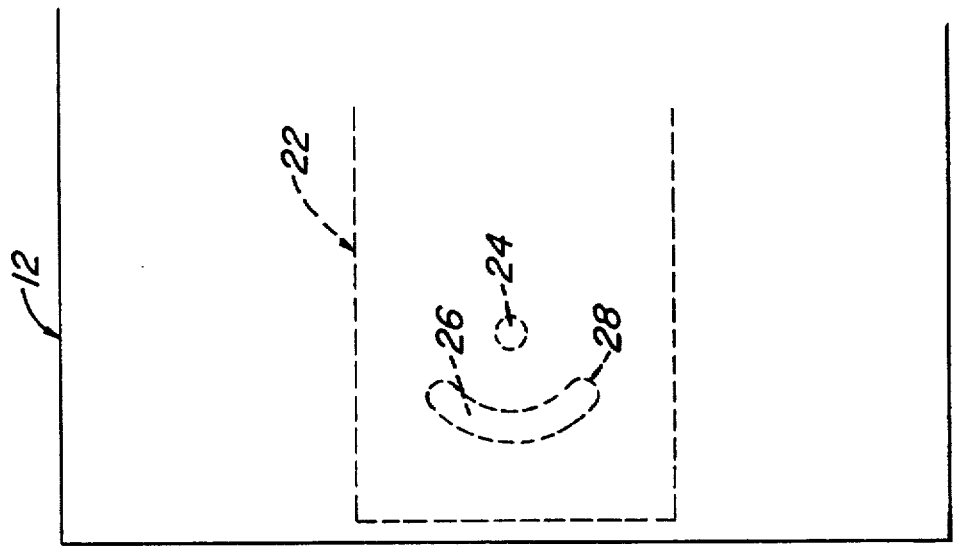
FIG. 1 is a top plan view of a fifth wheel plate of a tractor together with a trailer having a trailer plate shown in hidden line and constructed in accordance with the invention.

Referring to FIG. 1, a rearward portion of a tractor 10, such as those used for semi-trailers, and a forward portion of a trailer 12 are shown. The rearward end of the tractor 10 carries a fifth wheel plate 14, which is of conventional design except for the modifications described herein. The fifth wheel plate 14 has tapered slot extending rearward from a central opening 18. A stop bore 20 is formed and extends through the thickness of the fifth wheel plate 14 and is spaced forward of the central opening 18.

The trailer 12 carries a trailer plate 22, shown in hidden line, which is mounted to the lower surface of the trailer 12.

The trailer plate 22 has a king pin 24 which is received within the central opening 18 formed in the fifth wheel plate 14 for coupling the trailer 12 to the tractor 10. The king pin 24 and opening 18 provide a pivotal connection between the tractor 10 and trailer 12 which allows the trailer 12 to pivot relative to the tractor 10 about the king pin 24 with the trailer plate 22 bearing against the fifth wheel plate 14.

An elongated, arcuate slot 26 having opposite ends 28 is formed in the trailer plate 22 and which is radially spaced an equal distance from the kin pin 24 along its entire length. The stop bore 20 and opening 18 of the fifth wheel plate 14 are spaced apart this same distance so that when the king pin 24 is coupled to the fifth wheel plate 14, the slot 26 positions over the stop bore 20. The slot 26 should have an angle of arc, for example 45°, equivalent to the desired minimum degree of angular displacement of the trailer 12 relative to the longitudinal axis of the tractor 10 necessary to prevent anti-jackknifing events.

Referring to FIGS. 2 and 3, an anti-jackknifing device 30 is shown. The device 30 is formed from a pressure cylinder 32 having an upper end 33 and a lower end 35 with an axial bore 34 extending between the upper and lower ends. The upper end 33 of the cylinder 32 is provided with an annular flange 38 which has a top surface 37 which abuts flush against the lower surface of the fifth wheel plate 14. The pressure cylinder 32 is fastened to the fifth wheel plate 14 by means of bolts 40 which extend through the fifth wheel plate into internally threaded recesses 42 formed in the annular flange 38. When the pressure cylinder 32 is so secured to the fifth wheel plate, the axial bore 34 of the pressure cylinder 32 is concentrically aligned with the stop bore 20.

To further secure the pressure cylinder 32 to the fifth wheel plate 14, the stop bore 20 is provided with an upper facing shoulder 46. A cylinder locking member 48, such as a threaded lock nut, having an upper portion with an annular flange 50 is received within the stop bore 20, with the flange 50 seating against the upper facing shoulder 46 of the stop bore 20. The lower portion of the locking member 48 is provided with external helical threads 52. The lower threaded portion 52 extends downward from the stop bore 20 of the fifth wheel plate 14 into the axial bore 34 of the pressure cylinder 32 and threads into an internally threaded portion 53 of the axial bore 34. A resilient o-ring seal 56 provides a fluid tight seal between the locking member 48 and the axial bore 34.

A piston 60 locates within the axial bore 34 and divides the axial bore 34 into opposite upper and lower chambers 62, 64. The piston 60 has upper and lower annular grooves 66, 68 which receive piston rings 70, 72. The piston rings 70, 72, have a U-shaped cross-section and are formed from a resilient material, such as nitrile rubber. The piston rings 70, 72 are oriented so that the opening of the U-shaped upper piston ring 70 faces upwards, while the opening of the lower U-shaped piston ring 72 faces downwards, as shown in FIGS. 2 and 3.

Integrally joined with the piston 60 is a stop pin 74 which projects from the upper end of the piston 60 from the upper chamber 62 into the central bore 54 of the locking member 48. The piston 60 and stop pin 74 are reciprocally movable within the axial bore 34 of the pressure cylinder 32 between an extended position and a retracted position with the central bore 54 closely receiving the stop pin 74. A U-shaped seal ring 76, similar to the piston rings 70, 72, is received within an annular recess 78 formed within the locking member 48 which communicates with the central bore 54. The seal 76 surrounds the stop pin 74 with the open portion of the seal 76 facing downward, as shown in FIGS. 2 and 3, to provide a fluid tight seal of the central bore 54 while allowing the stop pin 74 to be reciprocally moved within the central bore 54. An additional o-ring seal 80 is located with a second annular recess 82 formed in the locking member 48 for sealing the central bore 54 of the locking member 48.

The piston 60 is moved between the extended and retracted positions by means of pressurized fluid, such as air, being injected through ports 86, 88 into the upper and lower chambers 62, 64, respectively. The ports 86, 88 are both adapted to be coupled to high pressure fluid hoses (not shown) for conducting high pressure fluids used in operating the device 30. To seal the lower chamber 64 of the axial bore 34, an end plug or cap 90 is coupled to the pressure cylinder 32. The end plug 90 is provided with a threaded portion 92 which engages threads 94 formed on the axial bore 34 of the cylinder 32 near the lower end. The end plug 90 abuts against the lower end of the pressure cylinder 32 and provides a fluid tight seal by means of o-ring seal 95 located in an annular recess formed in the lower end of the pressure cylinder 32.

Formed in the lower end of the piston 60, opposite the stop pin 74, is an axial, helically threaded socket 96 for receiving a corresponding threaded portion of a piston removal tool (not shown). At the upper most end of the threaded portion 92 of the end plug 90 is a piston stop 98 which projects upward for a short distance and is radially spaced apart from the walls of the axial bore 34. When the piston 60 is moved to the fully retracted position, the lower end of the piston 60 abuts against the piston stop 98 so that the piston 60 does not cover or seal the lower port 88. This also provides a volume or space into which fluid from the lower port 88 can be introduced into the axial bore 34 of the cylinder 32.

Similarly, a piston shoulder 100 is formed on the upper most end of the piston 60 where the stop pin 74 is joined to the piston 60. The piston shoulder 100 is also radially spaced apart from the walls of the axial bore 34 and seats or abuts against the lower end of the locking member 48 so that the piston 60 is prevented from sealing off the upper port 86. The piston shoulder 100 also provides a slight volume or space to allow fluid to be introduced into the upper chamber 62 through the upper port 86.

The operation of the device 30 is as follows. Initially, the trailer 12 is coupled to the tractor 10 by means of the king pin 24 being received within the opening 18. When so coupled, the trailer plate 22 bears against the fifth wheel plate 14 of the tractor 10. When the trailer 12 is within the selected minimum degree of angular displacement relative to the longitudinal axis of the tractor 10, the slot 26 will align with the stop bore 20 of the fifth wheel plate 14 along its length.

Initially, the stop pin 74 and piston 60 are in the retracted position, as shown in FIG. 2. In this position, the top of the stop pin 74 lies below the lower surface of the trailer plate 22 and thus clears the slot 26. This allows the trailer 12 to be pivoted about the king pin 24 beyond the selected minimum degree of angular displacement, such as during low speed turns and maneuvering of the tractor and trailer.

When it is necessary to engage the anti-jackknifing device to prevent jackknifing of the trailer, the operator can activate the device 30 so that pressurized fluid is introduced through the port 88 into the lower chamber 64. The pressurized fluid may be a gas, such as air, or a hydraulic fluid. As the pressurized fluid is introduced into the lower chamber 64, the piston 60 is forced upwards through the axial bore 34 so that the volume of the upper chamber 62 is reduced. Fluid contained within the upper chamber 62 is forced out of the axial bore 34 through the upper port 86. As pressurized fluid is continuously introduced into the lower chamber 64, the stop pin 74 is extended through the central bore 54 of the locking member 48 into the slot 26 of the trailer plate 22. Further upward movement of the piston 60 through the axial bore 34 is prevented by the piston shoulder 100 which seats against the lower end of the locking member 48. By maintaining the pressure within the lower chamber 64, the stop pin 74 can be kept in the raised or extended position, as shown in FIG. 3.

With the stop pin 74 in the raised or extended position, the stop pin 74 will abut against the ends 28 of the slot 26 as the trailer 12 is pivoted about the king pin 24. Further angular movement of the trailer about the king pin 24 is thus prevented beyond the minimum selected degree as defined by the slot 26. As is shown in FIGS. 2 and 3, the central bore 54 of the locking member 48 is sized to closely receive the stop pin 74. Thus, lateral force exerted on the stop pin 74 will cause the stop pin to bear against the sides of the central bore 54 of the locking member 48. This force is transferred to the fifth wheel plate 14 so that shear stress which would otherwise be exerted on the bolts 40 is reduced or eliminated. The locking member 48 also facilitates mounting of the pressure cylinder 32 so that the bolts 40 do not bear all of the weight of the pressure cylinder 32.

When danger of jackknifing is over or it is necessary to allow the trailer to be pivoted relative to the tractor beyond the selected minimum angle, the stop pin 74 is lowered by introducing pressurized fluid into the upper chamber 62 through the upper port 86. Pressurized fluid causes the piston 60 to move downward decreasing the volume of the lower chamber 64 so that fluid within lower chamber 64 passes out of the lower chamber 64 through port 88. With the stop pin in the fully retracted position, the lower surface of the piston 60 will abut against the piston stop 98 formed on the end of the threaded portion 92 of the end plug 90. This prevents the piston 60 and stop pin 74 from further downward movement. In the fully retracted position, the top of the stop pin 74 once again lies below the lower surface of the trailer plate 22 so that the trailer 12 can be turned relative to the tractor beyond the selected degree of angular displacement determined by the slot 26.

When the device 30 is not in use, the interior of the axial bore 34 can be accessed by removing the end plug 90. This is accomplished by inserting a tool into the socket 102 formed in the end plug 90 so that the end plug 90 can be unthreaded from the axial bore 34. Once the end plug 90 is removed, the piston 60 and stop pin 74 can be removed by inserting a piston removal tool having a complementary threaded member which can be threaded into the threaded socket 96 of the piston 60. The stop pin 74 and piston 60 can thus be pulled from the axial bore 34 for repair or replacement. This also facilitates retraction of the stop pin 74 if the stop pin becomes jammed or stuck in the extended position. The stop pin 74 and piston 60 are then replaced within the axial bore 34 and the end plug 90 is replaced as well for continued operation for the device 30.

Referring now to FIG. 4, another embodiment of the anti-jackknifing device is shown with similar components being designated with a single prime symbol. The device 30' differs from that of FIGS. 2 and 3 in that the locking member 48 is absent. The stop bore 20 of the fifth wheel plate 14 is provided with a lower facing shoulder 104 instead of the upper facing shoulder 46 of FIGS. 2 and 3. Within the stop bore 20 is a bushing member 106 having an upper facing shoulder 108 which seats against the lower facing shoulder 104 of the stop bore 20'.

The bushing member is sized so that the lower surface of the bushing member 106 is flush with the lower surface of the fifth wheel plate 14'. When the pressure cylinder 32 is bolted to the fifth wheel plate 14', the upper end of the pressure cylinder 32' seats flush against the lower surface of the fifth wheel plate 14' and abuts against the bushing member 106 forcing the shoulder 108 of the bushing 106 against the shoulder 104 of the fifth wheel plate 14' Thus, the bushing member 106 is retained within the stop bore 20. The bushing member 106 has a central bore 110 which closely receives the stop pin 74' when the stop pin 74' is moved to the extended or raised position. Annular recesses 112, 114 are formed in the pressure cylinder 32' which open into the axial bore 34' for receiving seal members 76' and 80', respectively.

When lateral forces are exerted against the stop pin 74' of the device 30' by the ends of the slot 26', the stop pin 74' bears against the bushing 106 so that force is thus transferred to the fifth wheel plate 14' and not to the pressure cylinder 32'. This prevents high shear stress from being exerted on the bolts 40' which fasten the cylinder 32' to the fifth wheel plate 14'.

FIG. 5 shows still another embodiment of an anti-jackknifing device 30" with similar components as that of FIGS. 2–4 being designated with a double prime symbol. As shown in FIG. 5, the fifth wheel plate 14" has formed therein a recess 116 defined by a peripheral edge 118 which is sized to closely receive the upper end of the pressure cylinder 32". The stop bore 20" is sized to closely receive the stop pin 74" without a bushing or locking member. When the stop pin 74" is in the extended position, lateral forces exerted against the stop pin 74" by the ends 28" of the slot 26" are transferred directly to the walls of the stop bore 20" of the fifth wheel plate 14". Additionally, lateral forces which may be imparted to the pressure cylinder 32" through the stop pin 74" and piston 60" are transferred through the upper end of the pressure cylinder to the peripheral edge 118 of the recess 116 formed in the fifth wheel plate 14". Thus, shear stress which would otherwise be exerted on the bolts 40" is reduced or eliminated.

The anti-jackknifing device of the invention has several advantages. The novel features of the anti-jackknifing devices of the invention prevent stresses which would otherwise be transmitted directly to the bolts holding the pressure cylinder to the fifth wheel plate. The locking member serves as a fastener for fastening the pressure cylinder in addition to the bolts used to mount the anti-jackknifing device to the lower surface of the fifth wheel plate. Because the locking member has a central bore which closely receives the stop pin, forces exerted against the stop pin are transferred to the fifth wheel plate and not against the bolts which would be susceptible to shearing. The bushing member also facilitates the transfer of forces to the fifth wheel plate instead of to the bolt which couple the pressure cylinder to the fifth wheel plate. The embodiment of the invention employing the recess formed in the fifth wheel plate and defined by the peripheral edge for receiving the upper end of the pressure cylinder also allows lateral forces to be transferred to the fifth wheel plate and not to the bolts used in mounting the pressure cylinder.

The removable end plug of the device allows the interior of the axial bore of the pressure cylinder to be accessed so that the piston can be easily pulled and removed from within the axial bore for replacement or repair, or to dislodge a jammed stop pin.

While the invention has been shown in only some of its forms, it should be apparent to those skilled in the art it is not so limited but is susceptible to various changes without departing from the scope of the invention.

We claim:

1. An anti-jackknifing device in combination with a tractor and trailer that are coupled together, the combination comprising:

a tractor having a fifth wheel plate with a stop bore formed therein, the stop bore having an upward facing shoulder;

a trailer having a trailer plate, the trailer plate having an elongated slot formed therein with opposite ends, the trailer plate bearing against the fifth wheel plate and coupling thereto by a pivotal connection so that the trailer is pivotable relative to the tractor about the pivotal connection, and wherein the slot aligns with the stop bore when the trailer plate is coupled to the fifth wheel plate and the tractor and trailer are within a selected degree of angular displacement relative to each other;

a pressure cylinder having an upper end and a lower end with an axial bore extending between the upper and lower ends, the upper end of the cylinder being mounted to a lower surface of the fifth wheel plate so that the axial bore is aligned with the stop bore of the fifth wheel plate, the cylinder having a pair of fluid ports for allowing the egress and ingress of pressurized fluid within the axial bore;

a piston located within the axial bore of the cylinder which divides the axial bore into opposite upper and lower chambers, each fluid port opening into one of the opposite chambers, the piston having an upper end with a stop pin joined thereto, the piston and stop pin being reciprocally movable between an extended position and a retracted position in response to pressurized fluid being introduced into the chambers from the fluid ports, the stop pin projecting from the upper chamber of the axial bore through the stop bore of the fifth wheel plate and into the slot of the trailer plate when the piston is moved to the extended position, the stop pin engaging one of the ends of the slot to limit pivotal movement of the trailer relative to the tractor about the pivotal connection beyond the selected degree of angular displacement, and wherein the stop pin locates below the slot of the trailer plate when the piston is moved to the retracted position to allow the trailer to pivot about the pivotal connection beyond the selected degree angular displacement;

a seal member which surrounds the stop pin for sealing the upper chamber of the axial bore while allowing the stop pin to be moved between the extended and retracted positions;

an end plug which couples to the pressure cylinder for sealing the lower chamber of the axial bore and which is removable to allow the axial bore to be accessed; and a cylinder locking member having a lower portion and an upper portion with a central bore extending through the lower and upper portions, the upper portion of the locking member being received within the stop bore of the fifth wheel plate and being secured therein, the lower portion of the locking member extending downward from the stop bore of the fifth wheel plate into the axial bore of the pressure cylinder and being secured thereto with the central bore of the locking member closely receiving the stop pin as the stop pin is moved to the extended position; and wherein the upper portion of the locking member has a flange which defines a lower facing shoulder which seats against the upward facing shoulder of the stop bore for securing the locking member within the stop bore.

2. The device of claim 1, wherein:

the piston has tool engagement means adapted for engaging a piston removal tool so that the piston can be removed from the axial bore when the end plug is removed.

3. The device of claim 1, wherein:

the locking member has an annular recess which receives the seal member surrounding the stop pin for sealing the upper chamber of the axial bore.

4. The device of claim 2, wherein:

the tool engagement means includes an internally threaded socket formed in the piston opposite the stop pin.

5. The device of claim 1, wherein:

the lower end of the pressure cylinder has helical threads formed thereon; and the end plug has a threaded portion which engages the threads of the pressure cylinder for coupling the end plug to the cylinder.

6. The device of claim 1, wherein:

the lower portion of the cylinder locking member and the axial bore of the pressure cylinder are provided with screw threads for securing the locking member to the pressure cylinder.

7. An anti-jackknifing device in combination with a tractor and trailer that are coupled together, the combination comprising:

a tractor having a fifth wheel plate with a stop bore formed therein;

a trailer having a trailer plate, the trailer plate having an elongated slot formed therein with opposite ends, the trailer plate bearing against the fifth wheel plate and coupling thereto by a pivotal connection so that the trailer is pivotable relative to the tractor about the pivotal connection, and wherein the slot aligns with the stop bore when the trailer plate is coupled to the fifth wheel plate and the tractor and trailer are within a selected degree of angular displacement relative to each other;

a pressure cylinder having an upper end and a lower end with an axial bore extending between the upper and lower ends, the upper end of the cylinder being mounted to a lower surface of the fifth wheel plate so that the axial bore is aligned with the stop bore of the fifth wheel plate, the cylinder having a pair of fluid ports for allowing the egress and ingress of pressurized fluid within the axial bore;

a piston located within the axial bore of the cylinder which divides the axial bore into opposite upper and lower chambers, each fluid port opening into one of the opposite chambers, the piston having an upper end with a stop pin joined thereto, the piston and stop pin being reciprocally movable between an extended position and a retracted position in response to pressurized fluid being introduced into the chambers from the fluid ports, the stop pin projecting from the upper chamber of the axial bore through the stop bore of the fifth wheel plate and into the slot of the trailer plate when the piston is moved to the extended position, the stop pin engaging one of the ends of the slot to limit pivotal movement of the trailer relative to the tractor about the pivotal connection beyond the selected degree of angular displacement, and wherein the stop pin locates below the slot of the trailer plate when the piston is moved to the retracted position to allow the trailer to pivot about the pivotal connection beyond the selected degree angular displacement;

a seal member which surrounds the stop pin for sealing the upper chamber of the axial bore while allowing the stop pin to be moved between the extended and retracted positions; and an end plug which couples to the pressure cylinder for sealing the lower chamber of the axial bore and which is removable to allow the axial bore to be accessed; and a cylinder locking member having a lower portion and an upper portion with a central bore extending through the lower and upper portions, the upper portion of the locking member being received within the stop bore of the fifth wheel plate and being secured therein, the lower portion of the locking member extending downward from the stop bore of the fifth wheel plate into the axial bore of the pressure cylinder and being secured thereto with the central bore of the locking member closely receiving the stop pin as the stop pin is moved to the extended position; and wherein the lower portion of the cylinder locking member and the axial bore of the pressure cylinder are provided with screw threads for securing the locking member to the pressure cylinder.

8. The device of claim 7, wherein:

the piston has tool engagement means adapted for engaging a piston removal tool so that the piston can be removed from the axial bore when the end plug is removed.

9. The device of claim 7, wherein:

the stop bore of the fifth wheel plate has an upward facing shoulder; and the upper portion of the locking member has a flange which defines a lower facing shoulder which seats against the upward facing shoulder of the stop bore for securing the locking member within the stop bore.

10. The device of claim 7, wherein:

the locking member has an annular recess which receives the seal member surrounding the stop pin for sealing the upper chamber of the axial bore.

11. The device of claim 8, wherein:

the tool engagement means includes an internally threaded socket formed in the piston opposite the stop pin.

12. The device of claim 7, wherein:

the lower end of the pressure cylinder has helical threads formed thereon; and the end plug has a threaded portion which engages the threads of the pressure cylinder for coupling the end plug to the cylinder.

13. An anti-jackknifing device in combination with a tractor and trailer that are coupled together, the combination comprising:

a tractor having a fifth wheel plate with a stop bore formed therein, the stop bore having an upward facing shoulder;

a trailer having a trailer plate, the trailer plate having an elongated slot formed therein with opposite ends, the trailer plate bearing against the fifth wheel plate and coupling thereto by a pivotal connection so that the trailer is pivotable relative to the tractor about the pivotal connection, and wherein the slot aligns with the stop bore when the trailer plate is coupled to the fifth wheel plate and the tractor and trailer are within a selected degree of angular displacement relative to each other;

a pressure cylinder having an upper end and a lower end with an axial bore extending between the upper and lower ends, the upper end of the cylinder mounting to a lower surface of the fifth wheel plate so that the axial bore is aligned with the stop bore of the fifth wheel plate, the cylinder having a pair of fluid ports for allowing the egress and ingress of pressurized fluid within the axial bore;

a piston located within the axial bore of the cylinder which divides the axial bore into opposite upper and lower chambers, each fluid port opening into one of the opposite chambers, the piston having an upper end with a stop pin joined thereto, the piston and stop pin being reciprocally movable between an extended position and a retracted position only in response to pressurized fluid being introduced into the chambers from the fluid ports, the stop pin projecting from the upper chamber of the axial bore through the stop bore of the fifth wheel plate and into the slot of the trailer plate when the piston is moved to the extended position and which engages one of the ends of the slot to limit pivotal movement of the trailer relative to the tractor about the pivotal connection beyond the selected degree of angular displacement, and which locates below the slot of the trailer plate when the piston is moved to the retracted position to allow the trailer to pivot about the pivotal connection beyond the selected degree angular displacement; and a cylinder locking member having a lower portion and an upper portion with a central bore extending through the lower and upper portions, the upper portion of the locking member being received within the stop bore of the fifth wheel plate and being secured therein, the lower portion of the locking member extending downward from the stop bore of the fifth wheel plate into the axial bore of the pressure cylinder and being secured thereto with the central bore of the locking member closely receiving the stop pin as the stop pin is moved to the extended position; and wherein the upper portion of the locking member has a flange which defines a lower facing shoulder which seats against the upward facing shoulder of the stop bore for securing the locking member within the stop bore.

14. The device of claim 13, further comprising:

a seal member which surrounds the stop pin for sealing the upper chamber of the axial bore while allowing the stop pin to be moved between the extended and retracted positions.

15. The device of claim 14, wherein:

the locking member has an annular recess which receives the seal member surrounding the stop pin for sealing the upper chamber of the axial bore.

16. The device of claim 13, further comprising:

an end plug which couples to the pressure cylinder for sealing the lower chamber of the axial bore and which is removable to allow the axial bore to be accessed; and wherein the piston has tool engagement means adapted for engaging a piston removal tool so that the piston can be removed from the axial bore when the end plug is removed.

17. The device of claim 16, wherein:

the tool engagement means includes an internally threaded socket formed in the piston opposite the stop pin.

18. The device of claim 16, wherein:

the lower end of the pressure cylinder has helical threads formed thereon; and the end plug has a threaded portion which engages the threads of the pressure cylinder for coupling the end plug to the cylinder.

19. The device of claim 13, wherein:

the lower portion of the cylinder locking member and the axial bore of the pressure cylinder are provided with screw threads for securing the locking member to the pressure cylinder.

20. An anti-jackknifing device in combination with a tractor and trailer that are coupled together, the combination comprising:

a tractor having a fifth wheel plate with a stop bore formed therein;

a trailer having a trailer plate, the trailer plate having an elongated slot formed therein with opposite ends, the trailer plate bearing against the fifth wheel plate and coupling thereto by a pivotal connection so that the trailer is pivotable relative to the tractor about the pivotal connection, and wherein the slot aligns with the stop bore when the trailer plate is coupled to the fifth wheel plate and the tractor and trailer are within a selected degree of angular displacement relative to each other;

a pressure cylinder having an upper end and a lower end with an axial bore extending between the upper and lower ends, the upper end of the cylinder mounting to a lower surface of the fifth wheel plate so that the axial bore is aligned with the stop bore of the fifth wheel plate, the cylinder having a pair of fluid ports for allowing the egress and ingress of pressurized fluid within the axial bore;

a piston located within the axial bore of the cylinder which divides the axial bore into opposite upper and lower chambers, each fluid port opening into one of the opposite chambers, the piston having an upper end with a stop pin joined thereto, the piston and stop pin being reciprocally movable between an extended position and a retracted position only in response to pressurized fluid being introduced into the chambers from the fluid ports, the stop pin projecting from the upper chamber of the axial bore through the stop bore of the fifth wheel plate and into the slot of the trailer plate when the piston is moved to the extended position and which engages one of the ends of the slot to limit pivotal movement of the trailer relative to the tractor about the pivotal connection beyond the selected degree of angular displacement, and which locates below the slot of the trailer plate when the piston is moved to the retracted position to allow the trailer to pivot about the pivotal connection beyond the selected degree angular displacement; and a cylinder locking member having a lower portion and an upper portion with a central bore extending through the lower and upper portions, the upper portion of the locking member being received within the stop bore of the fifth wheel plate and being secured therein, the lower portion of the locking member extending downward from the stop bore of the fifth wheel plate into the axial bore of the pressure cylinder and being secured thereto with the central bore of the locking member closely receiving the stop pin as the stop pin is moved to the extended position; and wherein the lower portion of the cylinder locking member and the axial bore of the pressure cylinder are provided with screw threads for securing the locking member to the pressure cylinder.

21. The device of claim 20, wherein:

the stop bore of the fifth wheel plate has an upward facing shoulder; and the upper portion of the locking member has a flange which defines a lower facing shoulder which seats against the upward facing shoulder of the stop bore for securing the locking member within the stop bore.

22. The device of claim 20, further comprising:

a seal member which surrounds the stop pin for sealing the upper chamber of the axial bore while allowing the stop pin to be moved between the extended and retracted positions.

23. The device of claim 22, wherein:

the locking member has an annular recess which receives the seal member surrounding the stop pin for sealing the upper chamber of the axial bore.

24. The device of claim 20, further comprising:

an end plug which couples to the pressure cylinder for sealing the lower chamber of the axial bore and which is removable to allow the axial bore to be accessed; and wherein the piston has tool engagement means adapted for engaging a piston removal tool so that the piston can be removed from the axial bore when the end plug is removed.

25. The device of claim 24, wherein:

the tool engagement means includes an internally threaded socket formed in the piston opposite the stop pin.

26. The device of claim 24, wherein:

the lower end of the pressure cylinder has helical threads formed thereon; and the end plug has a threaded portion which engages the threads of the pressure cylinder for coupling the end plug to the cylinder.

* * * * *